April 8, 1924.
C. E. HECKENLIVELY
1,489,827
INTERNAL COMBUSTION ENGINE
Filed March 1, 1922
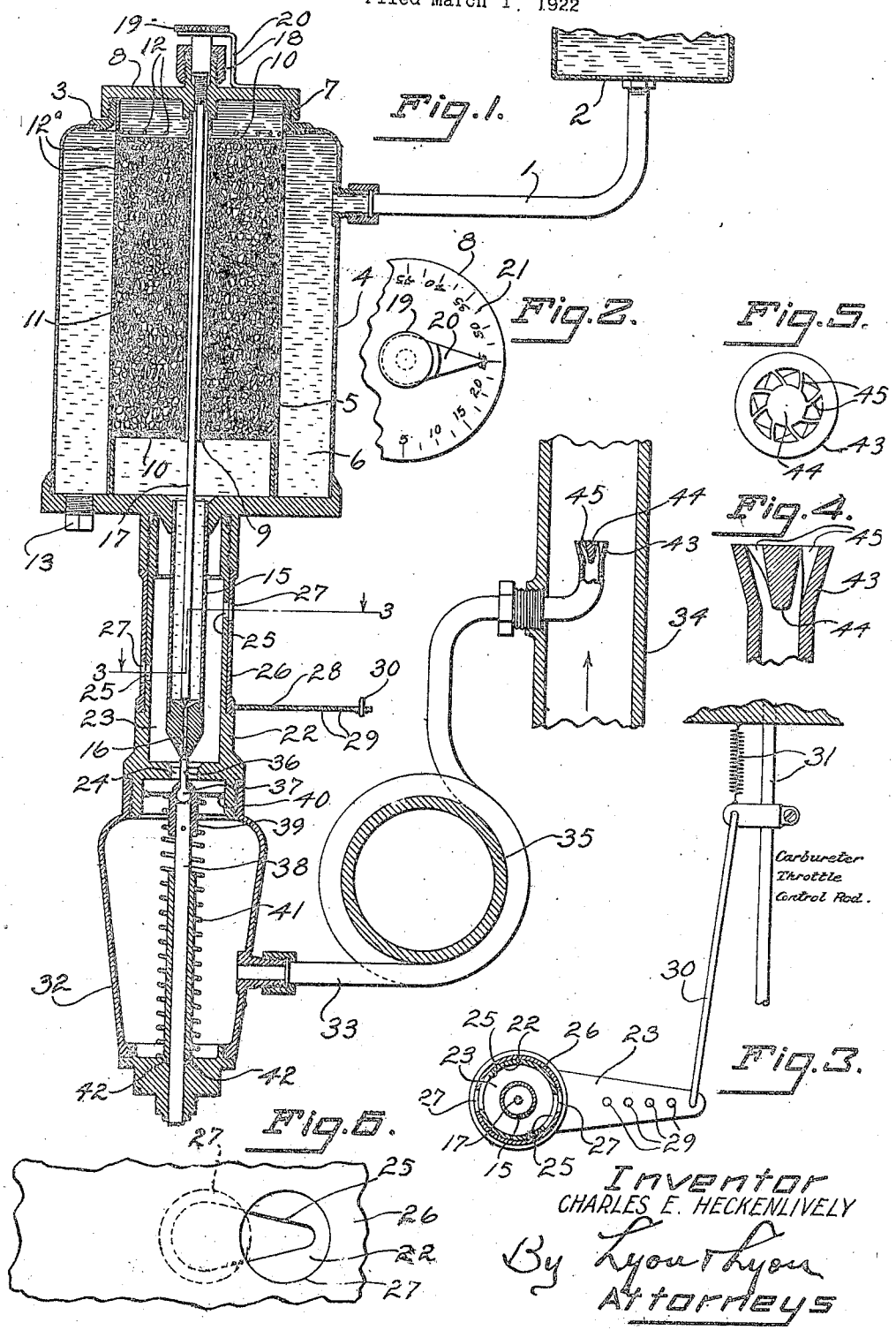
Inventor
CHARLES E. HECKENLIVELY
By Lyon & Lyon
Attorneys Patented Apr. 8, 1924.

1,489,827

UNITED STATES PATENT OFFICE.

CHARLES E. HECKENLIVELY, OF ANAHEIM, CALIFORNIA.

INTERNAL-COMBUSTION ENGINE.

Application filed March 1, 1922. Serial No. 540,364.

*To all whom it may concern:*

Be it known that I, CHARLES E. HECKEN- LIVELY, a citizen of the United States, residing at Anaheim, in the county of Orange and State of California, have invented a new and useful Improvement in Internal-Combustion Engines, of which the following is a specification.

This invention relates to internal combustion engines and is particularly directed to means for supplying moistui and auxiliary air to the intake manifold between the carbureter and the engine.

An object of the invention is to provide an arrangement whereby water and auxiliary air are combined and then heated to vaporize the water before being entrained into the intake manifold.

Another object is to provide an independent means adjustable to provide a minimum flow of water and means for varying the flow of auxiliary air corresponding to the speed of the engine to correspondingly vary the flow of water, combined with means normally preventing the feeding of the water and auxiliary air and automatically responsive to the suction in the manifold to permit a feeding of the water and air.

A further object is to provide a simple and efficient device for feeding and evaporating water into an air current; also to provide means for directing the induced moisture and air into the manifold in the direction of fuel feed and across the path of the fuel.

Various other objects and advantages will be more fully apparent from the following specification, and by reference to the accompanying drawings which form a part of this disclosure and which illustrate a preferred form of embodiment of the invention.

Of the drawings:

Figure 1 is a vertical section through the device of the present invention.

Fig. 2 is a partial plan view of Fig. 1, showing the indicating means for the moisture regulating valve.

Fig. 3 is a plan section on line 3—3 of Fig. 1.

Fig. 4 is an enlarged section of the discharge end of the conduit within the manifold.

Fig. 5 is a plan view thereof.

Fig. 6 is an enlarged detail view showing one of the auxiliary air ports and control valve therefor.

In the drawings, 1 designates a supply conduit which conveys water from a supply tank 2 to a filtering unit designated generally by the reference numeral 3.

The filtering unit has an outer shell 4 and an inner shell 5 forming an outer settling chamber 6 and an inner filtering chamber 7, the upper end of the two shells being joined together and closed by a cap 8 screw-threaded thereon. Secured to and depending from the cap 8 is a central tube 9 and the inner chamber is provided with separated perforated partitions 10 with the space between the partitions filled with filtering material 11, preferably loose wool. Above the upper partition 10 the inner shell 5 has a row of perforations 12 and below said partition on the side opposite the inlet end of the conduit 1, the shell 5 has two rows of perforations 12$^a$ distributed approximately one-half way around the shell.

In use, the larger particles of foreign matter in the water settles to the bottom of the settling chamber 6 whence it may be periodically removed through on opening normally closed by a plug 13, the water flowing through the perforation 12 to the upper portion of the filtering chamber 7 and through the upper perforated partition 10, and through the perforations 12$^a$, is filtered through the filtering material 11, discharging through the lower perforated partition 10 into the lower end of the inner chamber.

Extending downwardly from the base of the filtering unit 3 is a water nozzle 15 having a discharge port 16, and for the purpose of providing a regulated uniform discharge of water from said port I provide a needle valve in the form of a stem 17 which cooperates with the upper end of said port and extends upwardly through the tube 9, the cap 8, and a stuffing box 18, said valve having a screw-thread engagement in said cap 8 and a knurled knob 19 at its upper end so that the valve 17 may be manually regulated to permit a definite minimum flow of water from the discharge port 16.

Attached to the knob 19 is a pointer 20 arranged to travel over a scale 21 on the upper surface of the cap 8 to indicate the rate of flow, preferably in drops per minute.

Secured to the base of the filtering unit and surrounding the nozzle 15, is casing having a tubular member or neck 22 providing an auxiliary air chamber 23 and having an outlet port 24.

The member 22 has one or more air inlets or ports 25 positioned above the lower end of the water nozzle 15, said ports 25 being controlled by a rotary valve sleeve 26 rotatable on the member 22 and having ports 27 which when in registry with the ports 25 establish communication with the atmosphere, the ports 25 being closed by the solid portion of the sleeve valve 26 when the ports 27 are out of registry with the ports 25.

The preferable means of operating the valve sleeve 26 comprises a lever 28 attached to said sleeve and having a series of apertures 29 into one of which engages a link 30, and said link is preferably connected in such a way that it may be manually controlled, for example, it may be connected to and operated by the carbureter regulating means 31. (See Fig. 3.)

With reference to Fig. 6, it will be seen that the ports 25 are wedge shape so that when the valve sleeve 26 is rotated a gradual opening of the ports 25 will be effected.

The casing includes a drip chamber 32 carried by the neck 22, and communicating with a conduit 33 leading to the intake manifold 34 of the engine and disposed in contact with a heat radiating portion of the engine, such for instance, as being coiled around the exhaust manifold 35.

A suction operated valve comprises a needle valve member or plug 36 having a lower ball end 37 retained on the end of a valve stem 38 by a member 39 engaging over the ball and secured on the end of the stem, the valve member 36 being allowed a slight swinging movement in the member 39 so as to properly align with the discharge port 16 of the water nozzle 15 to close said port.

I provide means actuated by the engine suction, for actuating the water valve. For this purpose the member 39 is provided with an annular drip plate or flange 40 which has a close sliding fit in the lower bore of the tubular member 22 below the discharge port 16, and the stem 38 extends through the bottom of the drip chamber 32 and is axially slidable to open the valve 36 against the tension of a normalizing spring 41.

The drip chamber 32 is provided with drain ports 42 leading to the bore in which the stem 38 slides so that any water collecting in said chamber through leakage of the valve 36, or otherwise, will gradually drain past the valve stem 38.

The end of the conduit 33 within the intake manifold discharges in the direction of fuel feed (indicated by the arrow) and has a flared discharge nozzle 43 formed with a central spreading cone 44 joined to the inner wall of the nozzle 43 by spirally arranged webs 45 which produce a plurality of diverging ducts that spread the current of air and moisture and give a whirling action to the same, the nozzle 43 directing said air and moisture to the walls of the intake manifold 34 across the path of the fuel mixture.

With the device in normal condition with the valve sleeve 26 in position to close the auxiliary air ports 25, the air chamber 23 is air tight, and the spring 41 being strong enough to keep the valve 36 closed during low engine speeds, no moisture or auxiliary air will be fed to the intake manifold, especially will the suction valve be unaffected by suction until the air tight condition in the air chamber 23 is relieved by an opening of the air ports 25.

When the carbureter control means 31 operates the valve sleeve 26 to open the ports 25 the suction in the intake manifold will open the valve 36 to release the water feed, carrying the flange 40 out of the lower bore of the member 22 to establish communication between the auxiliary air chamber 23 and drip chamber 32 to the conduit 33. The water then drips down onto the upper face of the drip plate. As the drip-plate is directly in the path of the air current the evaporation of the water is very rapidly effected. Thus, as the engine speed increases, a gradually increasing amount of auxiliary air is admitted, and such auxiliary air as it passes the water discharge nozzle 15 entrains with it a correspondingly increased proportion of water, the air and water in its passage through the port 24 and around the valve flange 40 becoming thoroughly broken up and mixed, and in flowing through the conduit 33 the entrained moisture becomes vaporized by the heat of the exhaust manifold 35. Consequently there is discharged from the conduit and into the intake manifold a supply of damp air varying to correspond with the speed of the engine.

It will be evident that as the suction increases, due to an increase in the speed of the engine, the velocity of the auxiliary air entering the ports 25 will increase, and as such air wipes past the water discharge nozzle 15 and through the restricted discharge port 24 it will draw the water from the port 16 in amounts varying to correspond with the variations in the velocity of the auxiliary air, thereby insuring a definite ratio of the air and water controlled in volume entirely by the velocity of the air.

While the form of device herein illustrated and described is well adapted to fulfill all the objects primarily stated it is not intended to confine the invention in this regard for it is susceptible of embodiment in various other forms all coming within the scope of the claims which follow.

I claim:

1. In combination with an internal combustion engine having an intake manifold for conducting fuel mixture from a carbureter to the engine, a moisture supply device communicating with the intake manifold between the carbureter and the engine, said device including means for regulating the moisture supply, means adjustable to supply auxiliary air in amounts varying relative to the speed of the engine, and independent means for normally closing the water feed from the moisture supplying device and normally closing communication to the manifold, and having means enabling the same to respond to the suction in the manifold to permit the flow of quantities of water and auxiliary air to the manifold to correspond with the engine speed.

2. In combination with an internal combustion engine having an intake manifold for conducting fuel mixture from a carbureter to the engine, a moisture supply device with a conduit connected to the intake manifold between the carbureter and the engine, said device including a water supply, means for regulating the moisture supply to said conduit, means adjustable to supply auxiliary air to the conduit, in amounts varying relative to the speed of the engine, and independent means for normally closing the water feed from the said moisture supplying device and the conduit and having means actuated by, and automatically responsive to suction in the manifold to open the conduit and water feed.

3. In combination with an internal combustion engine having an intake manifold for conducting fuel mixture from a carbureter to the engine, and carbureter regulating means, a moisture supply device communicating with the intake manifold between the carbureter and the engine, said device for regulating the same to supply a minimum feed of water, means adjustable to supply auxiliary air and actuated by the carbureter regulating means to increase the auxiliary air feed as the speed of the engine increases, and independent means normally closing the water feed and closing communication to the manifold and responsive to suction in the manifold to permit the flow of water and auxiliary air to the manifold.

4. In combination with an internal combustion engine having an intake manifold for conducting fuel mixture from a carbureter to the engine, and a carbureter regulating means, a moisture supply device having a communicating conduit leading to the intake manifold between the carbureter and the engine, said device including a water supply, means for regulating the same to provide a minimum feed of water to said conduit, means adjustable to supply auxiliary air to the conduit and actuated by the carbureter regulating means of the engine to increase the auxiliary air feed as the speed of the engine increases, and independent means for normally closing the water feed and the conduit and having means actuated by and automatically responsive to suction in the manifold to open the conduit and water feed.

5. In combination with an internal combustion engine having a heated area, an intake manifold for conducting fuel mixture from a carbureter to the engine, a moisture supply device having a communicating conduit engaging said heated area and leading to the intake manifold between the carbureter and the engine, said device including a water supply, means for regulating the same to provide a minimum feed of water to the conduit, means adjustable to supply auxiliary air to the conduit in amounts varying relative to the speed of the engine, and independent means normally closing the water feed and the conduit and having means actuated by and automatically responsive to suction in the manifold to open the conduit and water feed.

6. In combination with an internal combustion engine having an intake manifold directing fuel mixture from a carbureter to the engine, a moisture supply device having a communicating conduit leading to the manifold between the carbureter and the engine, and means for regulating the supply of moisture entrained through the conduit, the said conduit terminating within the manifold and projecting in the direction of flow of the explosive mixture, and having a plurality of diverging ducts to direct the moisture towards the walls of the manifold and across the path of the fuel mixture.

7. In combination with an internal combustion engine having an intake manifold directing fuel mixture from a carbureter to the engine, a water supply, a moisture regulating device having a communicating conduit leading to the manifold between the carbureter and the engine, said device including a water nozzle having a discharge port and communicating with the water supply, a valve adjustable to provide a minimum water feed, an auxiliary air chamber surrounding said nozzle and communicating with the conduit, said chamber having an air inlet port back of the water discharge port, an air valve for controlling the auxiliary air port, and a suction valve in the path of the air current admitted through the air valves and having means for normally closing the water discharge port and the conduit and operating automatically to respond to suction in the manifold to open said water discharge port and conduit.

8. In combination with an internal combustion engine having an intake manifold directing fuel mixture from a carbureter to the engine, and a carbureter regulating means, a water supply, a moisture regulating device having a communicating conduit leading to the manifold between the carbureter and the engine, said device including a water nozzle having a discharge port and communicating with the water supply, a valve adjustable to provide a minimum water feed, an auxiliary air chamber surrounding said nozzle and communicating with the conduit, said chamber having an air inlet port back of the water discharge port, an air valve for controlling the auxiliary air port, means connecting said air valve to the carbureter regulating means whereby the amount of auxiliary air drawn into the engine increases as the engine speed increases, and a suction valve having means for normally closing the water discharge port and the conduit and operating automatically to respond to suction in the manifold to open said water discharge port and conduit.

9. In combination with an internal combustion engine having an intake manifold directing fuel mixture from a carbureter to the engine, a water supply, a moisture regulating device having a communicating conduit leading to the manifold between the carbureter and the engine, said device including a water filtering means communicating with the water supply, a water nozzle having a discharge port and communicating with the filtering means, a valve adjustable to provide a minimum water feed, an auxiliary air chamber surrounding said nozzle and communicating with the conduit, said chamber having an auxiliary air inlet port back of the water discharge port, an air valve for controlling the auxiliary air port, and a suction valve having means for normally closing the water discharge port and the conduit and operating automatically to respond to suction in the manifold to open said water discharge port and the conduit, the velocity of the air controlling the flow of water above said minimum.

10. In combination with an internal combustion engine having an intake manifold for directing the explosive mixture from the carbureter to the engine, a casing having a water valve therein with means for supplying water to the valve, said valve having an outlet and a plug for the outlet, a conduit connecting the casing below the valve with the engine intake, a drip-plate connected with the plug and disposed below the water valve outlet so as to receive water dripping from the water valve, an air inlet for the casing above the water valve, whereby the suction of the engine draws the drip plate downwardly, so that the upper face of the drip plate is exposed to the air current which is admitted at the air inlet and passes through the casing to the conduit.

11. In combination with an internal combustion engine having an intake manifold for directing the explosive mixture from the carbureter to the engine, a casing having a water valve therein with means for supplying water to the valve, said valve having a plug for the valve-opening, a drip plate connected with the valve plug, said casing having a bore receiving said drip plate, means for guiding the drip plate in a substantially vertical direction below the water valve, said casing having a drip-chamber below the bore, a conduit connecting the same with the engine intake, means for admitting air to the casing above the water valve whereby the suction of the engine in operation draws the drip plate downwardly in the bore and opens the water valve to permit water to drip down onto the drip plate and into the path of the air current passing downwardly from the air inlet.

12. In combination with an internal combustion engine having an intake manifold for directing the explosive mixture from the carbureter to the engine, a casing having a water valve therein with means for supplying water to the valve, said valve having a plug for the valve-opening, a drip plate connected with the valve plug, said casing having a bore receiving said drip plate, means for guiding the drip plate in a substantially vertical direction below the water valve, said casing having a drip-chamber below the bore, a conduit connecting the same with the engine intake, means for admitting air to the casing above the water valve whereby the suction of the engine in operation draws the drip plate downwardly in the bore and opens the water valve to permit water to drip down onto the drip plate and into the path of the air current passing downwardly from the air inlet, and a spring for normally holding the drip-plate elevated and the plug in position to close the water valve.

13. In combination with an internal combustion engine having an intake manifold for directing the explosive mixture from the carbureter to the engine, a casing having a tubular neck with a water nozzle therein, said water nozzle having an outlet at its lower end, a plug for the water outlet, a drip plate connected with the plug for actuating the plug to open the water valve, a conduit connecting the casing below the drip plate with the engine intake, said tubular neck having an air inlet, whereby the suction of the engine exerted through the conduit on the under side of the drip plate draws the same downwardly and opens the water valve to permit water to drip from the water valve onto the drip plate, the air current which is admitted at the air inlet operating to flow downwardly and over the drip plate as it passes to the conduit.

14. In combination with an internal combustion engine having an intake manifold for directing the explosive mixture from the carbureter to the engine, a casing having a tubular neck with a water nozzle therein, said water nozzle having an outlet at its lower end, a plug for the water outlet, a drip plate connected with the plug for actuating the plug to open the water valve, a conduit connecting the casing below the drip plate with the engine intake, said tubular neck having an air inlet, whereby the suction of the engine exerted through the conduit on the under side of the drip plate draws the same downwardly and opens the water valve to permit water to drip from the water valve onto the drip plate, the air current which is admitted at the air inlet operating to flow downwardly and over the drip plate as it passes to the conduit, and means for closing the air inlet to prevent admission of the air and thereby prevent the suction of the engine from opening the water valve.

15. In combination with an internal combustion engine having an intake manifold for directing the explosive mixture from the carbureter to the engine, a reservoir for water, a filter therein, a water nozzle extending downwardly from the filter to carry off the filtered water, a casing having a tubular neck surrounding the water nozzle and having a drip chamber below the water nozzle, said water nozzle having a valve outlet at its lower end, a plug guided in the casing for closing the water outlet and having a drip plate connected therewith for actuating the plug, a conduit connecting the drip chamber with the engine intake to enable the suction of the engine to be exerted in the drip chamber below the drip plate, said tubular neck having an air inlet, and means for closing the same, said air inlet operating to admit an air current which flows down the tubular neck and onto the drip plate to evaporate the water thereon as it moves toward the conduit.

16. In combination with an internal combustion engine having an intake manifold for directing the explosive mixture from the carbureter to the engine, a reservoir for water, a filter therein, a water nozzle extending downwardly from the filter to carry off the filtered water, a casing having a tubular neck surrounding the water nozzle and having a drip chamber below the water nozzle, said water nozzle having a valve outlet at its lower end, a plug guided in the casing for closing the water outlet and having a drip plate connected therewith for actuating the plug, a conduit connecting the drip chamber with the engine intake to enable the suction of the engine to be exerted in the drip chamber below the drip plate, said tubular neck having an air inlet, and means for closing the same, said air inlet operating to admit an air current which flows down the tubular neck and onto the drip plate to evaporate the water thereon as it moves toward the conduit, and a regulating stem having an operating head at the upper end of the reservoir and passing downwardly into the water nozzle to a point adjacent the water outlet for regulating the flow of water through the same.

Signed at Los Angeles, California, this 17th day of February, 1922.

CHARLES E. HECKENLIVELY.

Witnesses:
 CLARENCE B. FOSTER,
 L. BELL WEAVER.